US007730023B2

(12) United States Patent
MacGregor (10) Patent No.: US 7,730,023 B2
(45) Date of Patent: Jun. 1, 2010

(54) APPARATUS AND METHOD FOR STRATEGY MAP VALIDATION AND VISUALIZATION

(75) Inventor: John Malcolm MacGregor, Ascot (GB)

(73) Assignee: Business Objects Sotware Ltd., Dublin (IE)

( * ) Notice: Subject to any disclaimer, the term of this patent is extended or adjusted under 35 U.S.C. 154(b) by 203 days.

(21) Appl. No.: 11/316,792

(22) Filed: Dec. 22, 2005

(65) Prior Publication Data

US 2007/0156787 A1    Jul. 5, 2007

(51) Int. Cl.
*G06F 17/00* (2006.01)
(52) U.S. Cl. ..................................... 707/603
(58) Field of Classification Search .................. 707/204
See application file for complete search history.

(56) References Cited

U.S. PATENT DOCUMENTS

| 6,208,345 | B1 | 3/2001 | Sheard et al. | |
| 6,321,217 | B1* | 11/2001 | Maeda et al. | 706/47 |
| 7,194,465 | B1* | 3/2007 | MacGregor | 707/6 |
| 7,257,513 | B2* | 8/2007 | Lilly | 702/182 |
| 2002/0038228 | A1 | 3/2002 | Waldorf et al. | |
| 2002/0049621 | A1* | 4/2002 | Bruce | 705/7 |
| 2002/0198775 | A1* | 12/2002 | Ryan | 705/14 |
| 2003/0158768 | A1 | 8/2003 | Maeda | |
| 2003/0195780 | A1 | 10/2003 | Arora et al. | |
| 2004/0068429 | A1* | 4/2004 | MacDonald | 705/10 |
| 2005/0071737 | A1* | 3/2005 | Adendorff et al. | 715/500 |
| 2006/0161471 | A1* | 7/2006 | Hulen et al. | 705/10 |

* cited by examiner

*Primary Examiner*—Mohammad Ali
*Assistant Examiner*—Syed H Hasan
(74) *Attorney, Agent, or Firm*—Cooley Godward Kronish LLP (57) ABSTRACT

A computer-readable medium to direct a computer to function in a specified manner includes executable instructions to construct a strategy map characterizing a presumed causal link between a first business metric and a second business metric. A first pattern within data associated with the first business metric is identified; a second pattern within data associated with the second business metric is located. Any relationship between the first pattern and the second pattern is specified.

6 Claims, 6 Drawing Sheets

APPARATUS AND METHOD FOR STRATEGY MAP VALIDATION AND VISUALIZATION

BRIEF DESCRIPTION OF THE INVENTION

The present invention relates generally to business strategy maps. More particularly, the present invention relates to a method of verifying and visualizing a business strategy map.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information; content delivery infrastructure systems for delivery and management of reports and analytics; data warehousing systems for cleansing and consolidating information from disparate sources; and data management systems, such as relational databases or On Line Analytic Processing (OLAP) systems used to collect, store, and manage raw data.

There are a number of commercially available products to produce reports from stored data. For instance, Business Objects Americas of San Jose, Calif., sells a number of widely used report generation products, including Crystal Reports™, Business Objects OLAP Intelligence™, and Business Objects Enterprise™. As used herein, the term report refers to information automatically retrieved (i.e., in response to computer executable instructions) from a data source (e.g., a database, a data warehouse, and the like), where the information is structured in accordance with a report schema that specifies the form in which the information should be presented. A non-report is an electronic document that is constructed without the automatic retrieval (i.e., in response to computer executable instructions) of information from a data source. Examples of non-report electronic documents include typical business application documents, such as a word processor document, a presentation document, and the like.

A report document is generally created by a specialized tool including executable instructions to access data and format it. A report document where the content does not include external data, either saved within the report or accessed live, is a template document for a report rather than a report document. Unlike, other non-report documents that may optionally import external data within a document, a report document by design is primarily a medium for accessing, formatting, and presenting external data.

A report design tool contains executable instructions specifically designed to facilitate working with external data sources. In addition to instructions regarding external data source connection drivers, these instructions may include advanced filtering of data, instructions for combining data from different external data sources, instructions for updating join structure and relationships in report data, and instructions including logic to support a more complex internal data model (that may include additional constraints, relationships, and metadata).

In contrast to a spreadsheet type application, a report generation tool is generally not limited to a table structure but can support a range of structures. A report design tool is designed primarily to support imported external data, whereas a spreadsheet application equally facilitates manually entered data and imported data. In both cases, a spreadsheet application applies a spatial logic that is based on the table cell layout within the spreadsheet in order to interpret data and perform calculations on the data. In contrast, a report design tool is not limited to logic that is based on the display of the data, but rather can interpret the data and perform calculations based on the original (or a redefined) data structure and meaning of the imported data. Spreadsheets applications work within a looping calculation model, whereas report generation tools may support a range of calculation models. Although there may be an overlap in the function of a spreadsheet document and a report document, the applications used to generate these documents contain instructions with different assumptions concerning the existence of an external data source and different logical approaches to interpreting and manipulating imported data.

The present invention is related to the analytical and reporting aspects of BI. Establishing business strategies is an increasingly complex exercise. There are ongoing efforts to supply quantitative tools to enhance business strategy decision making. In particular, there is an increasing focus on various business metrics. A business metric is a measure of a standard associated with the performance of an enterprise (e.g., commercial, governmental, non-profit, etc.). One type of business metric is characterized as a Key Performance Indicator (KPI). While there are existing tools to identify KPIs, these tools do not rigorously analyze relationships between KPIs and the organization's strategy.

Therefore, it would be desirable to provide a new technique for promoting quantitative business decisions. In particular, it would be desirable to provide visual tools characterizing quantitative data analyses. More particularly, it would be desirable to provide a visual strategy map and techniques to validate relationships associated with a visual strategy map.

SUMMARY OF THE INVENTION

The invention includes a computer-readable medium to direct a computer to function in a specified manner. The computer-readable medium stores executable instructions to construct a strategy map characterizing a presumed causal link between a first business metric and a second business metric. A first pattern within data associated with the first business metric is identified; a second pattern within data associated with the second business metric is located. Any relationship between the first pattern and the second pattern is specified.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION OF THE INVENTION

Figure 1:
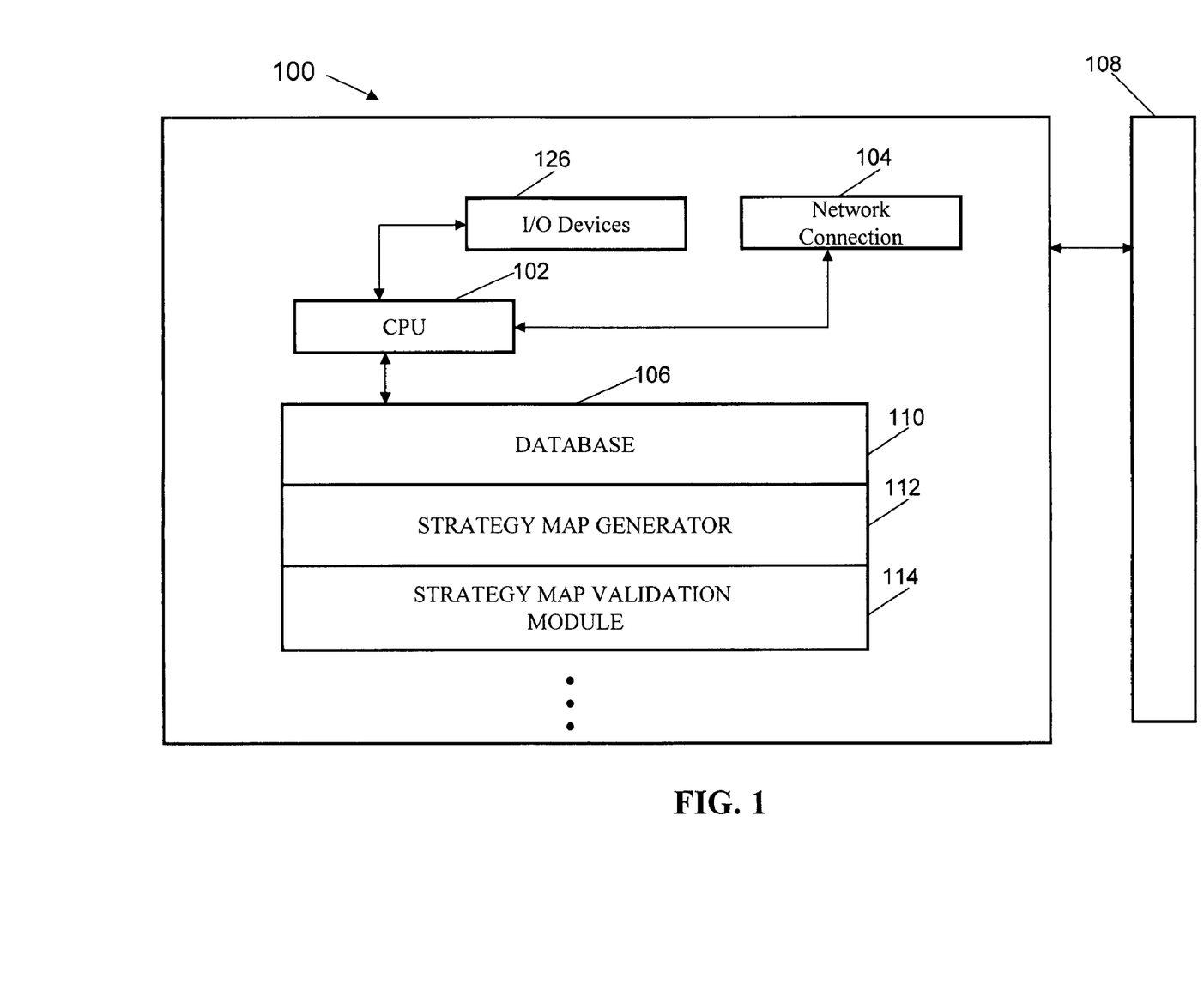
FIG. 1 illustrates a computer that may be operated in accordance with an embodiment of the invention.

FIG. 1 illustrates a computer 100 that may be operated in accordance with an embodiment of the invention. The computer 100 may be a server computer comprising conventional server computer components or a client computer comprising conventional client computer components. The computer 100 may be connected to a network 108 using any wire or wireless transmission channel.

As shown in FIG. 1, the computer 100 comprises a CPU 102 connected to a set of input/output devices 126 (e.g. keyboard, mouse, monitor, printer, etc.), a network connection device 104, and a memory 106. The memory 106 stores a set of executable programs to implement operations of the invention. One executable program is a strategy map generator 112. The strategy map generator 112 includes executable instructions to access database 110 resident in memory 106 to produce a strategy map.

A strategy map presents presumed cause and effect linkages between business metrics. As previously indicated, a business metric is a measure of a standard associated with the performance of an enterprise. One form of business metric is a Key Performance Indicator (KPI).

As shown in FIG. 1, the memory 106 also contains a strategy map validation module 114. The strategy map validation module 114 processes the strategy map generated by the strategy map generator 112. The strategy map validation module 114 is used to predict which business metric can be altered to achieve a desired strategic business outcome. By discerning what drivers in a business affect the realization of desired strategic outcomes, the strategy map validation module allows managers to achieve specific business goals. In one embodiment of the invention, the strategy map validation module 114 processes a strategy map generated by the strategy map generator 112 according to the operations illustrated in FIG. 2.

While the various components of memory 106 are shown residing in the single computer 100, it should be recognized that such a configuration is not required in all applications. For instance, the strategy map generator 112 may reside in a separate computer (not shown in FIG. 1) that is connected to the network 108. Similarly, separate modules of executable code are not required. The invention is directed toward the operations disclosed herein. There are any number of ways and locations to implement those operations, all of which should be considered within the scope of the invention.

Figure 2:
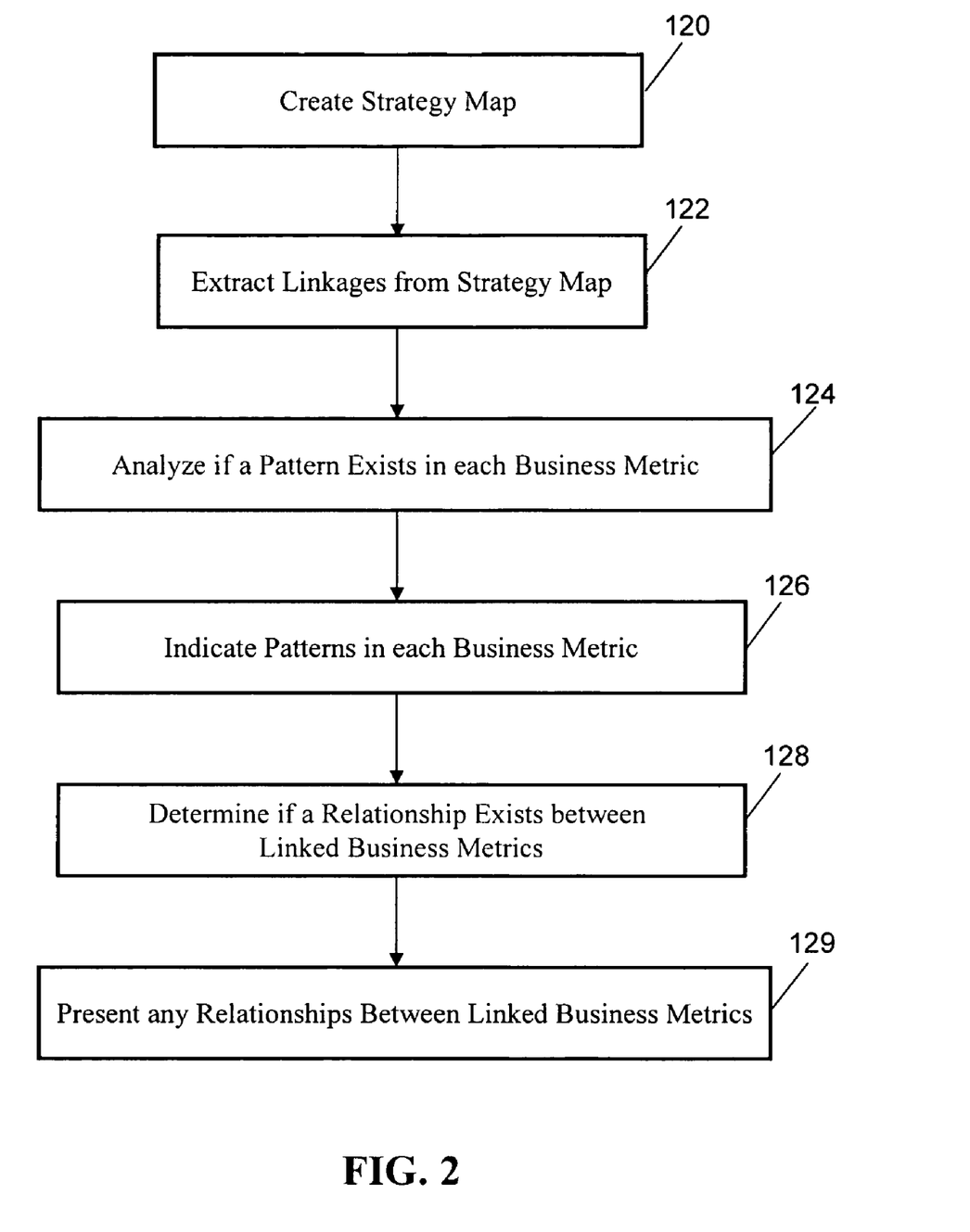
FIG. 2 illustrates processing operations performed in accordance with an embodiment of the invention.
Figure 3:
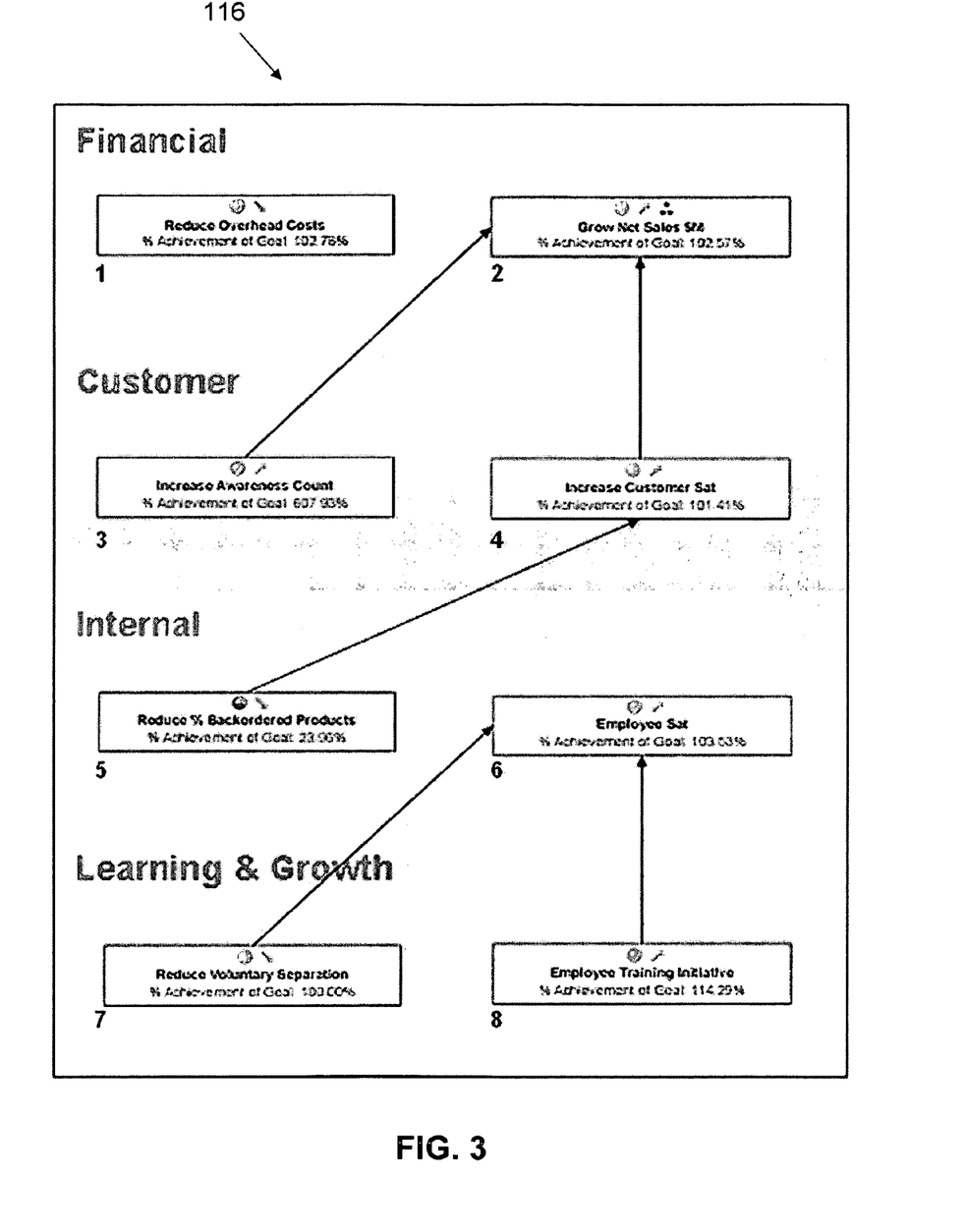
FIG. 3 illustrates an exemplary strategy map that may be processed in accordance with an embodiment of the invention.

The first processing operation shown in FIG. 2 is to create a strategy map 120. In one embodiment, this is implemented with executable code of the strategy map generator 112. An example of a strategy map is shown in FIG. 3. FIG. 3 illustrates a strategy map 116 with various classes of business metrics, including financial, customer, internal, and learning and growth. Within the financial business metric, there are individual business metrics directed to reducing overhead costs (block 1) and growing net sales (block 2). Within the customer business metric, there are individual business metrics directed to increasing awareness count (block 3) and increasing customer satisfaction (block 4). Within the internal business metric, there are individual business metrics of reducing back ordered products (block 5) and employee satisfaction (block 6). Finally, within the learning and growth business metric, there are individual business metrics of reducing voluntary separation (block 7) and employee training initiatives (block 8).

Presumed cause and effect linkages between various business metrics may be added to the strategy map 116. In one embodiment, the strategy map generator 112 includes executable instructions to automatically specify presumed causal links between different business metrics. This may be implemented in any number of ways, including rules sets specifying relationships between business metrics, lookup tables specifying links between business metrics, and the like. In addition, the strategy map generator 112 is configured to allow a user to select links between business metrics.

Regardless of the source of the links, the invention facilitates an understanding of the impact that business metrics have on one another. This gives a business the ability to develop a strategy to obtain a desired strategic outcome by altering or varying one or more business metrics. Thus, the invention allows a strategy map to represent a business strategy hypothesis that may be easily tested against actual data.

In the example of FIG. 3, the strategy map 116 connects the business metric labeled "Increase Awareness Count" (block 3) to the business metric labeled "Grow Net Sales" (block 2). This link postulates that an increase in customer awareness causes an increase in net sales. Thus, the strategy map 116 hypothesizes that an increase in net sales could be achieved by increasing customer awareness. Similarly, as shown in FIG. 3, the strategy map 116 hypothesizes that implementing an "Employee Training Initiative" (block 8) will lead to an increase in employee satisfaction (block 6).

As shown in FIG. 3, links in a strategy map may span two or more business metrics. For instance, the strategy map 116 predicts that an increase in net sales (block 2) can be accomplished by reducing the percent of backorders (block 5). This is accomplished indirectly by an increase in customer satisfaction (block 4). Accordingly, the strategy map 116 hypothesizes that reducing the percent of backorders will cause an increase in customer satisfaction, which will cause an increase in net sales.

Figure 4:
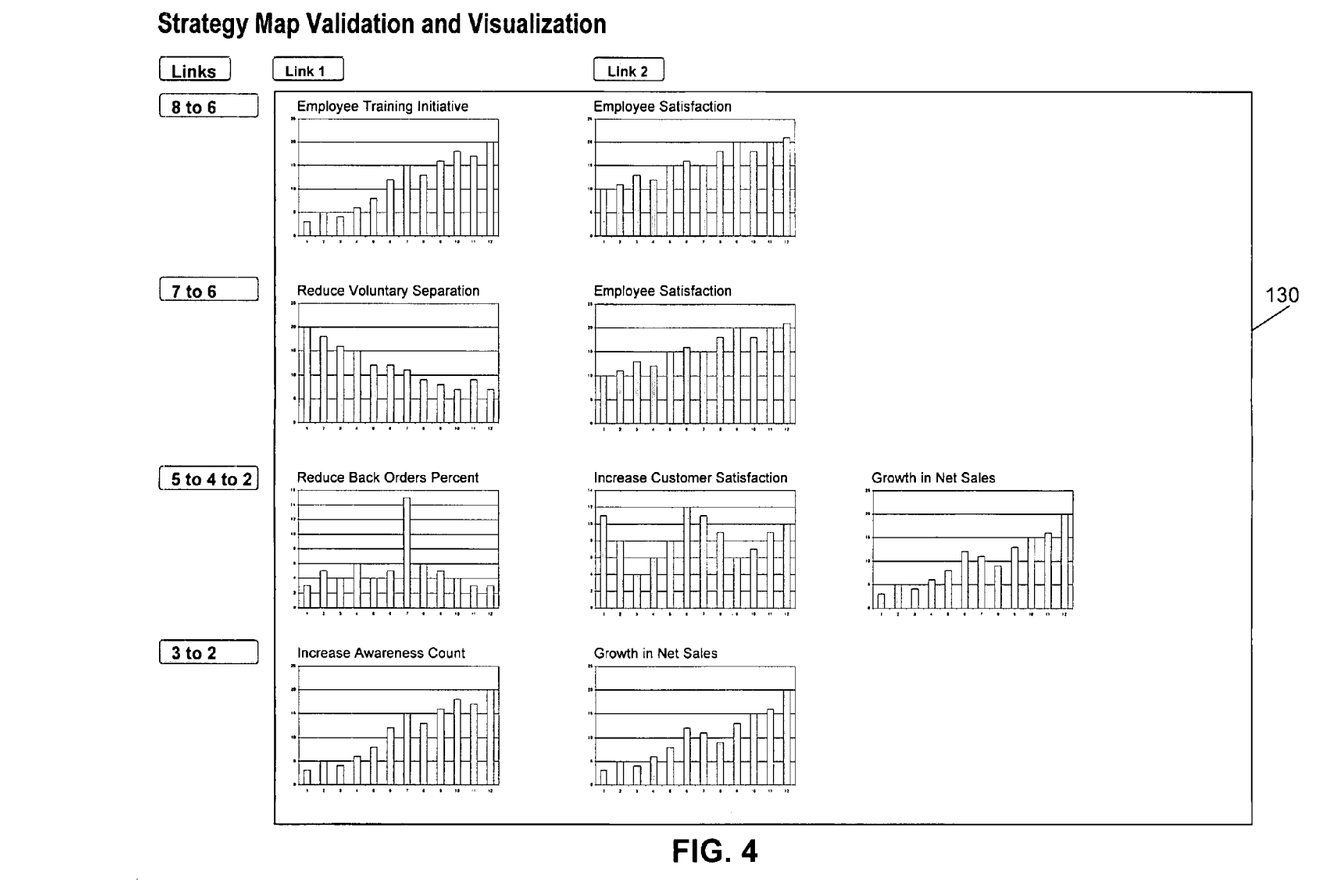
FIG. 4 illustrates a user-interface screen that indicates business metric data series and the hypothesized relationships indicated in FIG. 3.

Returning to FIG. 2, the next operation is to extract strategy map linkages 122. As previously indicated, the linkages may be generated automatically or in response to user input. The strategy map validation module 114 may be used to extract the linkages, regardless of linkage source. The strategy map validation module 114 may be configured to display the links, along with data associated with business metrics specified by the links. For instance, the extracted linkages of strategy map 116 are shown in the user-interface screen 130 of FIG. 4. In particular, each link is specified by the business metric blocks that form the link. As discussed previously, the strategy map generator 112 hypothesizes that an increase in employee training (i.e. "Employee Training Initiative") will cause an increase in employee satisfaction (i.e. "Employee Sat"). Thus, a link is created between the two business metrics as shown in FIG. 4. The link may be represented by extracting the data series associated with each business metric and displaying the data as shown in FIG. 4. This gives the user the ability to effectively view the data series for each business metric and the hypothesized relationship in the strategy map on one user-interface screen. The same process is then applied to the rest of the links in the strategy map 116 to generate the information of FIG. 4.

The next processing operation of FIG. 2 is analyzing whether any pattern exists in the extracted business metric data 124. For the strategy map 116, this means analyzing if any patterns exist in the business metric data of FIG. 4. FIG.

4 illustrates 12 data points (i.e., 1-12) for each business metric. The strategy map validation module 114 then searches for and identifies any pattern that exists in each business metric data series.

The strategy map validation module may define a plurality of patterns that may be referred to as candidate patterns to search for in the business metric data. Exemplary patterns that can be defined by the strategy map validation module 114 include linear positive patterns, linear negative patterns, non-linear positive patterns, non-linear negative patterns, positive outlier patterns, negative outlier patterns, cyclical patterns, and random behavior patterns. In general, the strategy map validation module 114 will identify any pattern that exists in each business metric data set that has been extracted into a link. These patterns can be identified using the techniques described in the commonly owned patent application entitled "Apparatus and Method for Identifying Patterns in a Multi-Dimensional Database", Ser. No. 10/113,917, filed Mar. 28, 2002.

Figure 5:
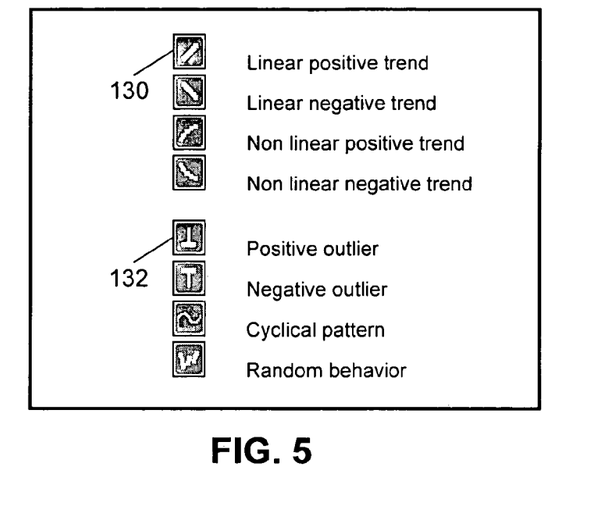
FIG. 5 illustrates icons that may be presented to indicate various patterns identified in accordance with an embodiment of the invention.

Returning to FIG. 2, the next processing operation is to indicate any patterns that are identified in each business metric 126. This operation involves visually displaying any pattern that is identified in a business metric data series. As shown in FIG. 5, different patterns may be represented by different diagrams. For instance, a linear positive pattern may be represented by the linear positive trend diagram 130 or a positive outlier pattern may be represented by the positive outlier diagram 132. FIG. 5 illustrates additional icons and associated trend behavior that may be characterized in accordance with the invention. The strategy map validation module 114 may be used to produce the icons shown in FIG. 5.

As shown in FIG. 2, the next operation is to determine if a relationship exists between the business metric data series in each link 128. The strategy map validation module 114 compares the previously established patterns in each business metric data series with others in a given link to determine if a relationship between them exists. For example, if the business metric data series associated with a link shows random patterns then no relationship exists in the link. If one data series has an outlier pattern and the other in a link does not, then it is assumed that no outlier relationship exists. If both data series in a link have corresponding outlier patterns, then a relationship might exist with a lagged outlier effect. Similar comparisons are applied to test for significant linear relationships, non-linear relationships, and cyclical relationships that may be determined between each data series in a link.

Figure 6:
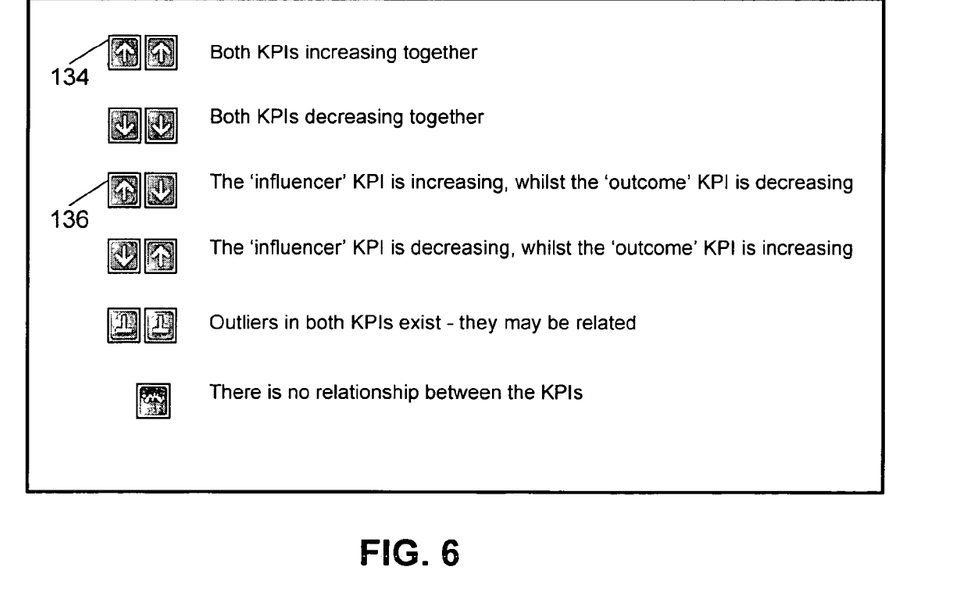
FIG. 6 illustrates icons that may be presented to indicate relationships identified in accordance with an embodiment of the invention.

Returning to FIG. 2, the last operation the strategy map validation module 114 takes in processing the strategy map is to present any relationships between business metrics in a link 129. First, the strategy map validation module 114 assigns at least one icon to represent the relationship, if any, that is determined to exist in a link. As shown in FIG. 6, different icons represent different relationships that may have been identified. For instance, if both data series in a link show an increasing linear pattern then the strategy map validation module 114 may determine that an increasing relationship exists in the link and may present this relationship with the increasing relationship diagram 134. Similarly, if the first data series in a link (i.e. the "influencer") is found to have a linear increasing pattern and the second data series in a link (i.e. the "outcome") is found to have a linear decreasing pattern, then a relationship will be determined to exist and may be presented with the corresponding diagram 136. A similar process is applied to other relationships that may have been determined in a link.

Figure 7:
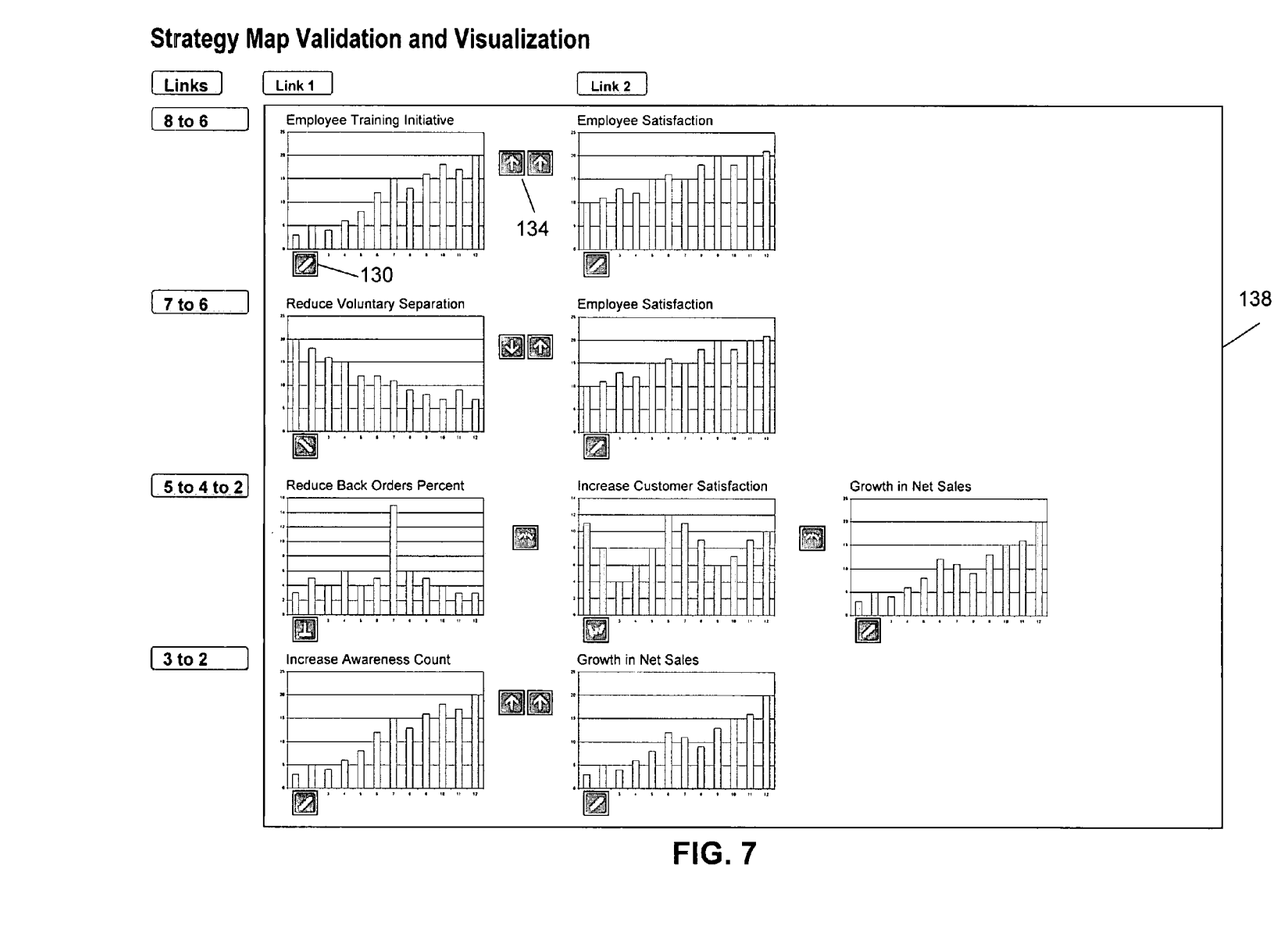
FIG. 7 illustrates a user-interface screen that provides a summary of patterns and relationships identified in accordance with an embodiment of the invention.

Turning next to FIG. 7, a sample user interface screen 138 is shown that provides a summary of results for the various patterns and relationships that were searched and identified in the strategy map 116. For example, as shown in FIG. 7, any pattern that was analyzed in each data series is presented below its respective data series. Accordingly, below "Employee Training Initiative," the linear positive trend diagram 130 previously discussed is presented. This indicates that a linear positive pattern was identified in the "Employee Training Initiative" data series. Similarly, FIG. 7 also presents any relationship that was determined between data series in a link. To illustrate, the increasing relationship diagram 134 previously discussed is displayed between the "Employee Training Initiative" and "Employee Satisfaction" data series indicating that an increasing relationship exists within the link. Similar information is presented for the rest of the data series and links of the strategy map validation module 114. This gives the user the ability to effectively visualize any relationships that may exist between business metric data and validate the predictions set forth in a strategy map.

Various statistical tests may be applied to the business metrics. For example, the invention may be implemented using Runs Test, a Mean Successive Squared Difference Test, an Autocorrelation Test, a Tukey Test, a Variance Test, and a Regression Analysis.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

While the present invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process step or steps, to the objective, spirit and scope of the present invention. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

What is claimed is:

1. A computer storage product with a computer-readable medium to direct a computer to function in a specified manner, comprising executable instructions to:

construct a strategy map characterizing a presumed causal link between a first business metric and a second business metric;

identify a first pattern within data associated with the first business metric;

locate a second pattern within data associated with the second business metric;

present a first graph of data associated with the first business metric;

display a second graph of data associated with the second business metric;

show a first icon adjacent to the first graph, wherein the first icon visually demonstrates the first pattern within the first graph;

render a second icon adjacent to the second graph, wherein the second icon visually demonstrates the second pattern within the second graph; and supply a relationship icon between the first graph and the second graph, wherein the relationship icon visually demonstrates a pattern relationship between the first graph and the second graph, wherein the relationship icon is selected from icons representing a concurrent increase in the first pattern and the second pattern, icons representing a concurrent decrease in the first pattern and the second pattern, icons representing a divergent pattern between the first pattern and the second pattern, icons representing potentially correlated outlier, values within the first pattern and the second pattern, and an icon representing a lack of correlation between the first pattern and the second pattern.

2. The computer storage product with the computer-readable medium of claim 1, wherein the executable instructions to construct a strategy map include executable instructions to specify a presumed causal link between the first business metric and the second business metric.

3. The computer storage product with the computer-readable medium of claim 1, wherein the executable instructions to construct a strategy map include executable instructions to accept a user-defined presumed causal link between the first business metric and the second business metric.

4. The computer storage product with the computer-readable medium of claim 1, wherein the executable instructions to identify and locate include executable instructions to specify a pattern selected from a linear pattern, a non-linear pattern, an outlier pattern, a cyclical pattern, and a random pattern.

5. The computer storage product with the computer-readable medium of claim 1, further comprising executable instructions to apply a statistical test to the first pattern and the second pattern.

6. The computer storage product with the computer-readable medium of claim 5, wherein the statistical test is selected from a Runs Test, a Mean Successive Squared Difference Test, an Autocorrelation Test, a Tukey Test, a Variance Test, and a Regression Analysis.

* * * * *